US012812131B2

(12) United States Patent
Ding et al.

(10) Patent No.: US 12,812,131 B2
(45) Date of Patent: Nov. 24, 2026

(54) ADAPTIVE CODING BASED ON REGION OF INTEREST

(71) Applicant: Tencent America LLC, Palo Alto, CA (US)

(72) Inventors: Ding Ding, Washington, DC (US); Xin Zhao, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 19/025,871

(22) Filed: Jan. 16, 2025

(65) Prior Publication Data

US 2025/0234010 A1 Jul. 17, 2025

Related U.S. Application Data

(60) Provisional application No. 63/622,060, filed on Jan. 17, 2024.

(51) Int. Cl.
*H04N 19/167* (2014.01)
*H04N 19/14* (2014.01)
*H04N 19/176* (2014.01)

(52) U.S. Cl.
CPC ........... *H04N 19/167* (2014.11); *H04N 19/14* (2014.11); *H04N 19/176* (2014.11)

(58) Field of Classification Search
None
See application file for complete search history.

(56) References Cited

U.S. PATENT DOCUMENTS

2020/0104623 A1* 4/2020 Jhang ..................... G06V 10/54
2025/0324067 A1* 10/2025 Kalva ................. H04N 19/132

* cited by examiner

*Primary Examiner* — James M Anderson, II
(74) *Attorney, Agent, or Firm* — Arent Fox Schiff LLP

(57) ABSTRACT

Some aspects of the disclosure provide a method of video decoding. For example, a coded video bitstream is received. The coded video bitstream includes at least coded information of a current picture, the current picture includes at least a first block that satisfies an overlapping requirement with a region of interest (ROI), the overlapping requirement requires an overlapping to the ROI to be less than a threshold. The ROI is determined based on the coded information of the current picture. The first block is determined to satisfy the overlapping requirement based on the ROI. At least a first block level syntax of the first block is obtained according a default value that is defined for blocks that satisfies the overlapping requirement. The first block is reconstructed based on the default value of the first block level syntax.

20 Claims, 7 Drawing Sheets

ADAPTIVE CODING BASED ON REGION OF INTEREST

INCORPORATION BY REFERENCE

The present application claims the benefit of priority to U.S. Provisional Application No. 63/622,060, "ADAPTIVE CODING BASED ON REGION OF INTEREST" filed on Jan. 17, 2024. The entire disclosure of the prior application is hereby incorporated by reference in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods and apparatuses for video encoding/decoding. In some examples, an apparatus for video encoding/decoding includes processing circuitry.

Some aspects of the disclosure provide a method of video decoding. For example, a coded video bitstream is received. The coded video bitstream includes at least coded information of a current picture, the current picture includes at least a first block that satisfies an overlapping requirement with a region of interest (ROI), the overlapping requirement requires an overlapping to the ROI to be less than a threshold. The ROI is determined based on the coded information of the current picture. The first block is determined to satisfy the overlapping requirement based on the ROI. At least a first block level syntax of the first block is obtained according a default value that is defined for blocks that satisfies the overlapping requirement. The first block is reconstructed based on the default value of the first block level syntax.

Some aspects of the disclosure provide a method of video encoding. For example, whether a first block in a current picture satisfies an overlapping requirement with a region of interest (ROI) is determined, the overlapping requirement requires an overlapping of the first block with the ROI to be less than a threshold. Not to signal one or more block level syntax of the first block is determined when the first block satisfies the overlapping requirement. The current picture is encoded to generate coded information that lacks the one or more block level syntax of the first block.

According to an aspect of the disclosure, a method of processing visual media data is provided. In the method, a conversion between a visual media file and a bitstream of visual media data is performed according to a format rule. In an example, the bitstream includes coded information of a picture, the picture includes at least a first block that satisfies an overlapping requirement with a region of interest (ROI), the overlapping requirement requires an overlapping to the ROI to be less than a threshold. The format rule specifies that: the ROI is determined based on the coded information of the picture; the first block is determined to satisfy the overlapping requirement based on the ROI; at least a first block level syntax of the first block is obtained according a default value that is defined for blocks that satisfies the overlapping requirement; and the first block is reconstructed based on the default value of the first block level syntax.

Aspects of the disclosure also provide an apparatus for video encoding. The apparatus for video encoding including processing circuitry configured to implement any of the described methods for video encoding.

Aspects of the disclosure also provide a method for video decoding. The method including any of the methods implemented by the apparatus for video decoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
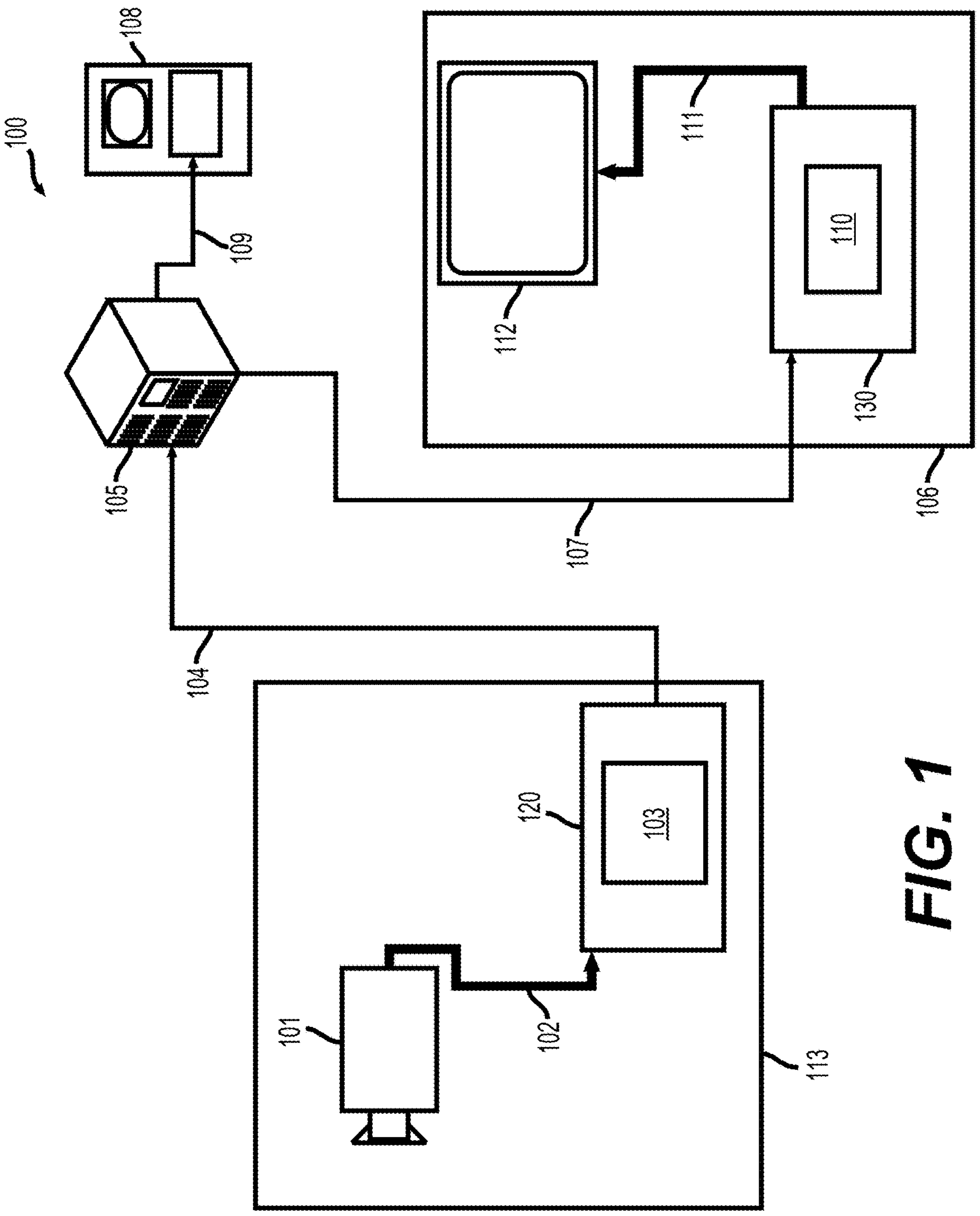
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
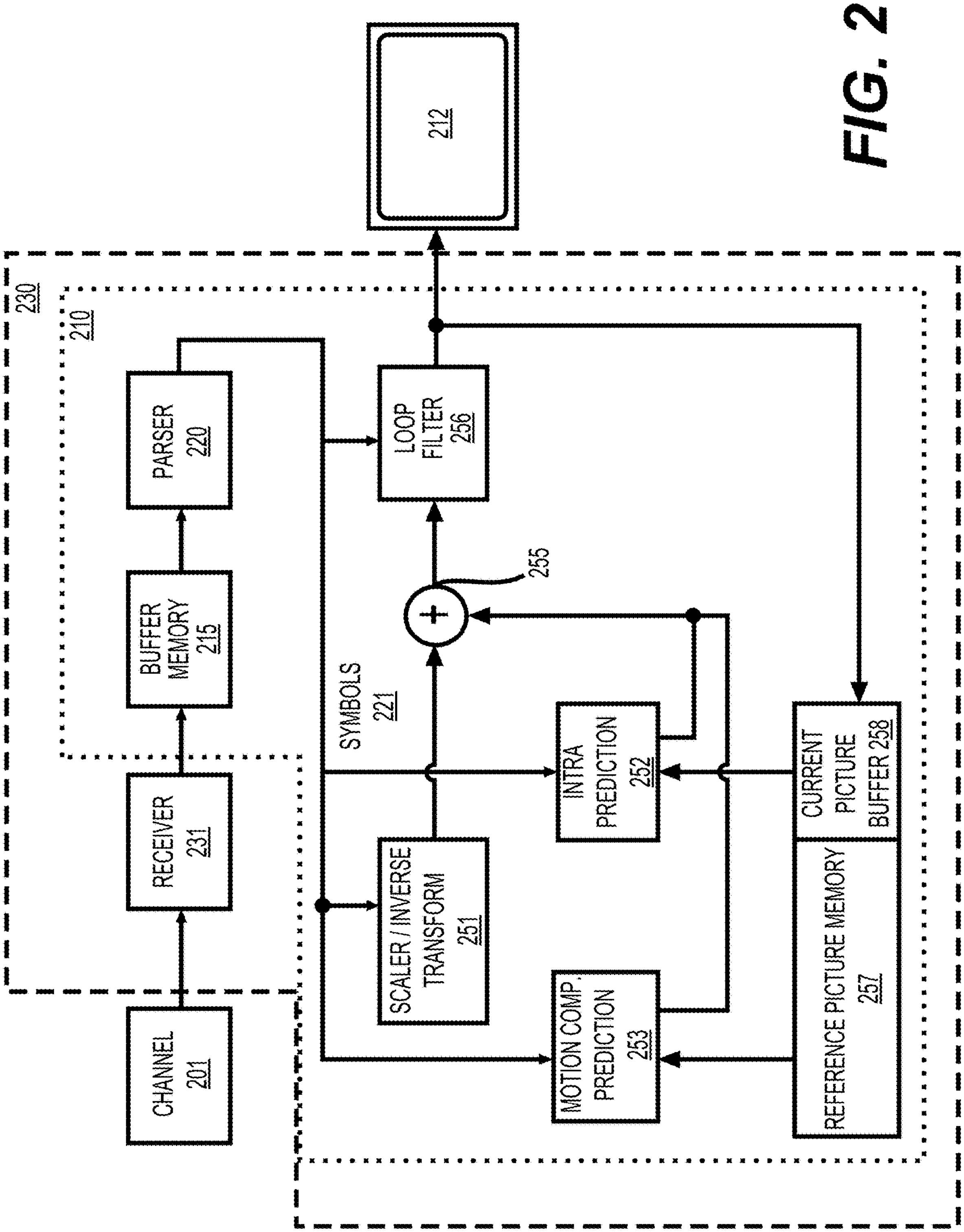
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
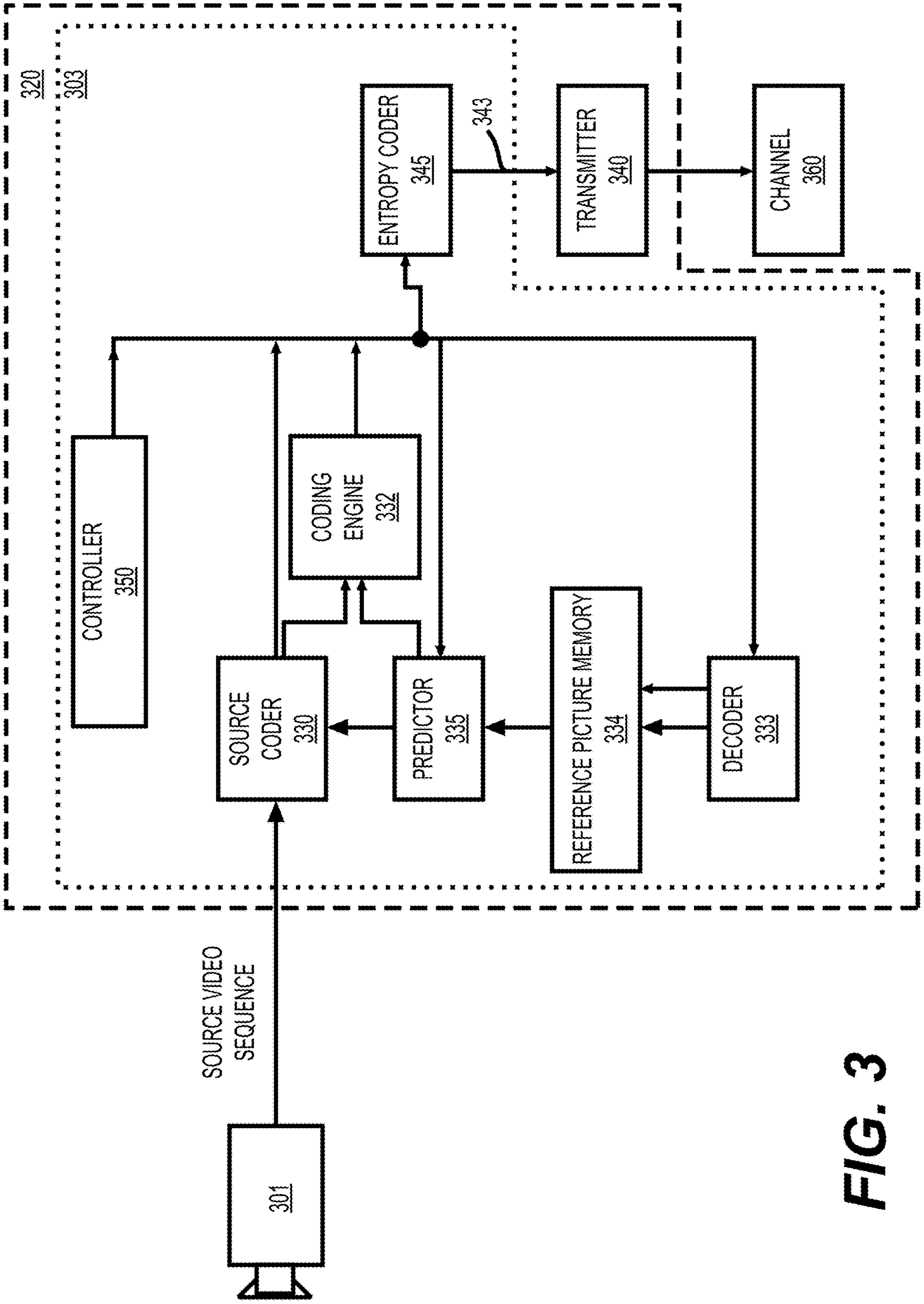
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

According to some aspects of the disclosure, video coding can be used in machine scenarios.

Figure 4:
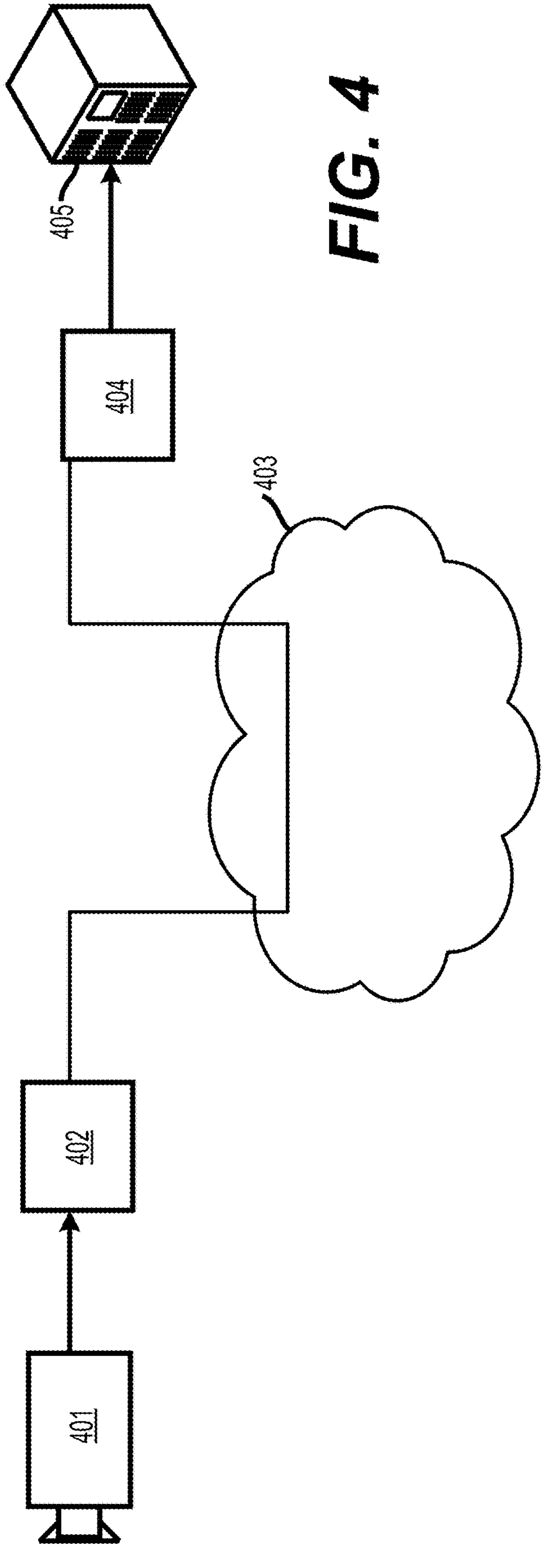
FIG. 4 shows a block diagram of a video processing system in a machine scenario in some examples.

FIG. 4 shows a block diagram of a video processing system (400) in a machine scenario in some examples. In the FIG. 4 example, the video processing system (400) includes a plurality of video sources for machine consumption. For example, the video processing system (400) includes a camera (401) coupled to an encoder device (402).

In some examples, an encoder can be optimized for machine consumption. For example, the encoder device (402) is optimized for encoding bitstreams for machine consumption. For example, the encoder device (402) is coupled, via a network (403), to a decoder device (404), and the decoder device (404) is coupled to a machine (405) that consumes the decoded video (e.g., perform further analysis, detection, and the like on the video). Thus, an encoded bitstream can be provided from the encoder device (402) to the decoder device (404) via the network (403), and the encoded bitstream can be decoded by the decoder device (404), and the decoded video data can be further processed by the machine (405).

In certain environments, such as in video coding for consumption by machines (in contrast to humans), the requirement for a bitstream to pass a quality threshold based on human perception may not be required. Instead, the quality can be sufficient for machine consumption even if not adequate for human consumption.

Video compression can be used for not only human but also machine consumptions. In some examples, video compression for machine consumption can be based on traditional video codecs as the core codec. However, traditional video codecs are primarily standardized for video application served for human vision, and additional coding tools or pre-/post-processing methods can be applied on top of a traditional video codec to achieve a higher coding efficiency for machine consumptions, measured by bitrate and machine task scores, e.g., object detection accuracy rates.

The present disclosure provides a set of block-level adaptive videos coding methods based on region of interest. The methods may be used separately or combined in any order. Further, each of the techniques (or embodiments), methods, encoders, and decoders can be implemented by processing circuitry (e.g., one or more processors or one or more integrated circuits). In one example, the one or more processors execute a program that is stored in a non-transitory computer-readable medium.

It is noted that the video coding techniques in the present disclosure can be used for video coding for machines (VCM) as well as in general video coding systems that may be served for human consumptions.

In some aspects, an area in a picture can be referred to as a texture area when the area has noticeable variation in appearance due to patterns or irregularity. In the present disclosure, essential area or region of interest refers to a texture area that contains meaningful contents, such as an area in foreground, an area with objects, and the like. According to some aspects of the present, the coding of an area can be adaptive based on region of interest. For example, when a texture area is not essential area or not region of interest, the texture area can be represented by default values or given patterns that does not carry information of the actual content. For example, a texture area can be represented by constant grey area.

In some examples, in video coding, particularly for machine-oriented tasks, certain regions within a video frame are considered as non-essential (or not a region of interest) for coding purposes. In an example for car detection, region of sky or region of building can be considered as non-essential or not region of interest in some coding examples. The present disclosure provides techniques to enable adaptive coding based on region of interest. For example, encoder/decoder can determine ROI and determine whether a block satisfies an overlapping requirement with a region of interest (ROI), the overlapping requirement requires an overlapping to the ROI to be less than a threshold. When the block satisfies the overlapping requirement, the encoder can omit at least a syntax element for the block in a bitstream, and the decoder can reconstruct the block according a default value that is defined for blocks that satisfies the overlapping requirement.

According to some aspects of the disclosure, the information (position, shape, size etc.) of region of interest (or essential area), such as the coordinates of the corners of rectangular area of region of interest, is signaled to the decoder. Thus, the encoder and the decoder have the same knowledge of the region of interest. At the encoder, the signaling of block-level syntax is dependent on the determination whether the current block has partial/none/full overlap with a region of interest. At the decoder, the decoding of the block-level syntax is dependent on the determination whether the current block has partial/none/full overlap with the region of interest.

In some aspects, partitioning information can be adaptively coded based on region of interest. For example, during the partitioning of a coding block, for at least one sub-partition, based on a condition using the relative position between the sub-partition and a region of interest, partial or all the syntax associated with this sub-partition is skipped and not signaled.

In some examples, the condition is based on whether an overlap of the sub-partition with the region of interest (also referred to as essential area) exceeds a predefined percentage threshold (e.g. with regard to the sub-partition). When the overlap of the sub-partition and the region of interest is less than a predefined percentage threshold of the sub-partition, partial or all the syntax associated with the sub-partition is skipped and not signaled. Otherwise, when the overlap of the sub-partition and the region of interest exceeds a predefined percentage threshold (e.g., is above the predefined percentage threshold), at the encoder side, the encoder includes partial or all the syntax elements associated with the sub-partition in the bitstream, and at the decoder side, the decoder can parse partial or all the syntax elements of the sub-partition from the bitstream. In an example, the predefined percentage threshold is a default value. In another example, the predefined percentage threshold is signaled in the bitstream, e.g., in high-level syntax.

In some examples, when partial or all the syntax elements associated with the sub-partition is skipped and not signaled, default values of the skipped syntax elements are used at the decoder side for performing decoding. In an example, the block partitioning mode is not signaled for a current sub-partition, then the block partitioning mode is derived as a default value at the decoder side. For example, the default value indicates that the current sub-partition is not further partitioned.

In some aspects, for a coding block, based on a condition using the relative position between the coding block and a region of interest, the decoding of the coding block can be performed by setting the values of syntaxes associated with the coding block as default values.

In some examples, the residuals are set as a default value, such as 0. For example, when a coding block has no overlap with the region of interest, the residuals are not signaled, and the decoder can set residuals to zero.

In some examples, the reconstruction samples are set as default value. For example, when a coding block has no overlap with the region of interest, the decoder can set the reconstruction samples of the coding block to default values.

In an example, the reconstruction samples are set as default values based on the output/internal bit depth value (denoted as d) for decoding the bitstream. For example, the reconstruction samples are set as the middle value of the full sample value range given the internal bit depth, such as $2^{(d-1)}$ and the like. In an example, for the 8-bit internal/output bit depth, value 128 can be the default value. For 10-bit internal/output bit depth sequences, value 512 can be the default value.

In some examples, the default value can be signaled in the bitstream. The default value can be signaled at any suitable level, such as high-level syntax, sequence-level syntax, frame-level syntax, slice-level syntax, tile-level syntax, sub-picture-level syntax and the like.

In some aspects, the determination whether the current block has partial/none/full overlap with a region of interest can be performed by comparing whether a group of samples of the current block are located within the region of interest.

In some examples, sample level comparison is used to determine whether every sample of the current coding block is located within the region of interest. For example, sample-by-sample comparison of samples in coding block is performed to determine whether the current coding block has partial/none/full overlap with the region of interest (also referred to as the essential area).

In some examples, an N×N level comparison is used. In an example, N can be set to 4. The current coding block is split into multiple N×N blocks. Further, a specific sample of each N×N block is checked to determine whether the specific sample is within the region of interest. In an example, when the specific sample in an N×N block is within the region of interest, the N×N block is considered to be within the region of interest.

According to some aspects of the disclosure, the information (position, shape, size etc.) of region of interest (also referred to as essential area), such as the coordinates of the corners of rectangular area of region of interest, is not signaled to the decoder, but can be implicitly derived based on coded information that is known to both encoder and decoder.

In some aspects, the information (position, shape, size etc.) of the region of interest (essential area) is implicitly derived based on reconstruction sample values. In some examples, the reconstruction sample values refer to the reconstruction sample values after adding residuals to prediction samples, but before applying one or more loop-filtering (e.g., deblocking, sample adaptive offset, adaptive loop filtering, cross-sample offset, loop restoration).

In an example, for output/internal bit depth d, a reconstruction sample (or a group of samples) value is compared to the middle value of the full sample value range given the internal bit depth, denoted as t, e.g., 2^(d−1). When the reconstruction sample value is same as t or the difference to t is within a given range, then the sample associated with this reconstruction sample value is determined not to be a part of region of interest.

According to some aspects of the disclosure, various information can be adaptively coded based on the region of interest. The encoder does not signal the information of the region of interest, but adaptively generates the coded information of regions based on whether the regions are within the region of interest or out of the region of interest, and the decoder can derive the region of interest based on the coded information. For example, the encoder can code the region of interest regularly based on the content in the region of interest, and code samples out of the region of interest with values that cause the reconstruction samples out of the region of interest to have the middle value of the full sample value range. Thus, at the decoder side, after reconstruction, the decoder can derive that the reconstruction samples are out of the region of interest (not a part of the region of interest).

In some aspects, partitioning information can be adaptively coded based on region of interest. For example, during the partitioning of a coding block, for at least one sub-partition, based on a condition using the relative position between the sub-partition and a region of interest, partial or all the syntax associated with this sub-partition is skipped and not signaled.

In some examples, the condition is based on whether an overlap of the sub-partition with the region of interest (also referred to as essential area) exceeds a predefined percentage threshold (e.g. with regard to the sub-partition). When the overlap of the sub-partition and the region of interest is less than a predefined percentage threshold of the sub-partition, partial or all the syntax associated with the sub-partition is skipped and not signaled. Otherwise, when the overlap of the sub-partition and the region of interest exceeds a predefined percentage threshold (e.g., is above the predefined percentage threshold), at the encoder side, the encoder includes partial or all the syntax elements associated with the sub-partition in the bitstream, and at the decoder side, the decoder can parse partial or all the syntax elements of the sub-partition from the bitstream. In an example, the predefined percentage threshold is a default value. In another example, the predefined percentage threshold is signaled in the bitstream, e.g., in high-level syntax.

In some examples, when partial or all the syntax elements associated with the sub-partition is skipped and not signaled, default values of the skipped syntax elements are used at the decoder side for performing decoding. In an example, the block partitioning mode is not signaled for a current sub-partition, then the block partitioning mode is derived as a default value at the decoder side. For example, the default value indicates that the current sub-partition is not further partitioned.

In some aspects, for a coding block, based on a condition using the relative position between the coding block and a region of interest, the decoding of the coding block can be performed by setting the values of syntaxes associated with the coding block as default values.

In some examples, the residuals are set as a default value, such as 0. For example, when a coding block has no overlap with the region of interest, the residuals are not signaled, and the decoder can set residuals to zero.

In some examples, the reconstruction samples are set as default value. For example, when a coding block has no overlap with the region of interest, the decoder can set the reconstruction samples of the coding block to default values, such as a middle value in the full sample value range.

In an example, the reconstruction samples are set as default values based on the output/internal bit depth value (denoted as d) for decoding the bitstream. For example, the reconstruction samples are set as the middle value of the full sample value range given the internal bit depth, such as 2^(d−1) and the like. In an example, for the 8-bit internal/output bit depth, value 128 can be the default value. For 10-bit internal/output bit depth sequences, value 512 can be the default value.

In some examples, the default value can be signaled in the bitstream. The default value can be signaled at any suitable level, such as high-level syntax, sequence-level syntax, frame-level syntax, slice-level syntax, tile-level syntax, sub-picture-level syntax and the like.

In some aspects, the determination whether the current block has partial/none/full overlap with a region of interest can be performed by comparing whether a group of samples of the current block are located within the region of interest.

In some examples, sample level comparison is used to determine whether every sample of the current coding block is located within the region of interest. For example, sample-by-sample comparison of samples in coding block is performed to determine whether the current coding block has partial/none/full overlap with the region of interest (also referred to as the essential area).

In some examples, an N×N level comparison is used. In an example, N can be set to 4. The current coding block is split into multiple N×N blocks. Further, a specific sample of each N×N block (e.g., the upper left sample, the bottom right sample, and the like) is checked to determine whether the specific sample is within the region of interest. In an example, when the specific sample in an N×N block is within the region of interest, the N×N block is considered to be within the region of interest.

Figure 5:
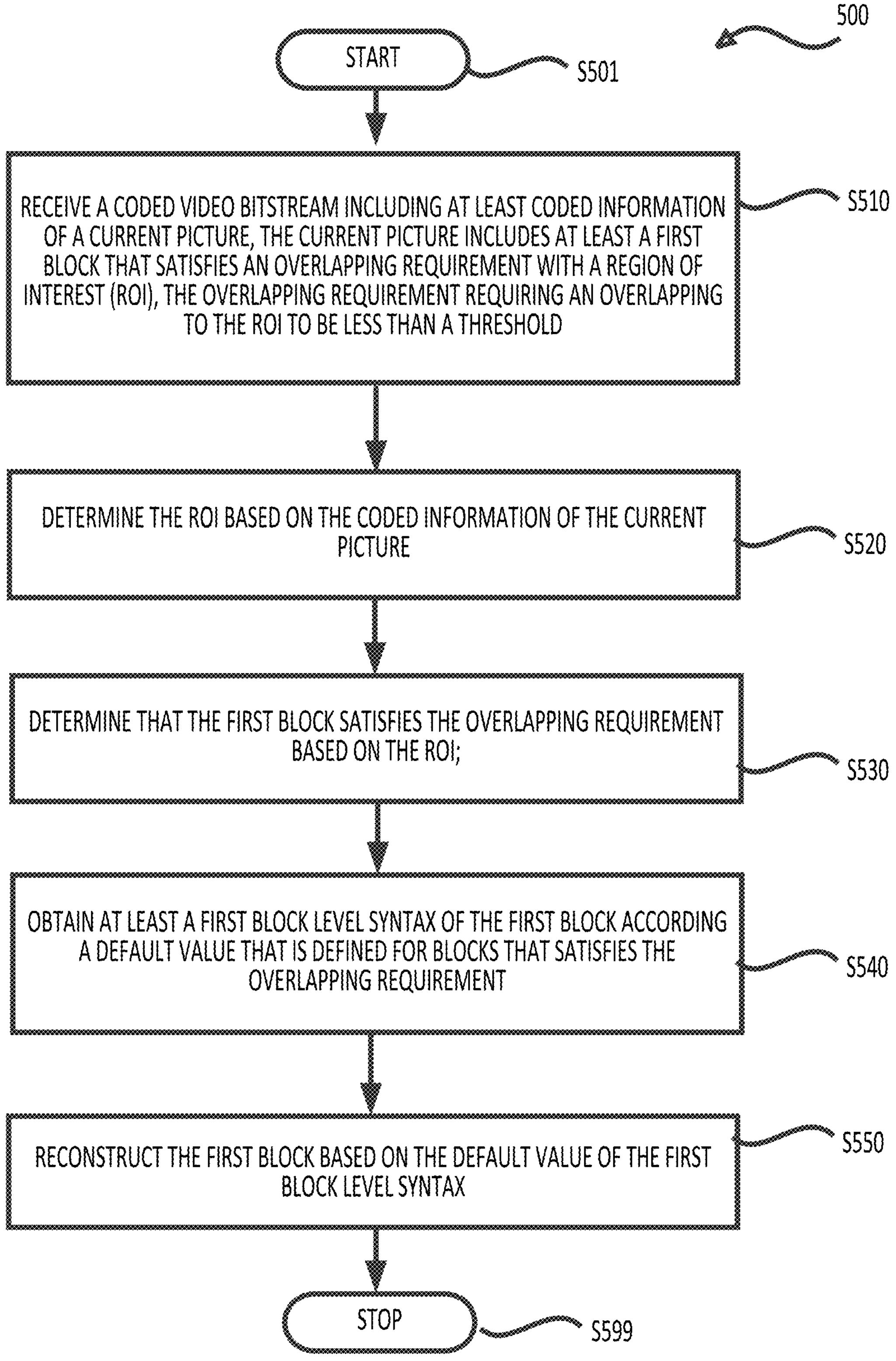
FIG. 5 shows a flow chart outlining a decoding process according to some aspects of the disclosure.

FIG. 5 shows a flow chart outlining a process (500) according to an aspect of the disclosure. The process (500) can be used in a video decoder. In various aspects, the process (500) is executed by processing circuitry, such as the processing circuitry that performs functions of the video decoder (110), the processing circuitry that performs functions of the video decoder (210), and the like. In some aspects, the process (500) is implemented in software instructions, thus when the processing circuitry executes the software instructions, the processing circuitry performs the process (500). The process starts at (S501) and proceeds to (S510).

At (S510), a coded video bitstream is received. The coded video bitstream includes at least coded information of a current picture, the current picture includes at least a first block that satisfies an overlapping requirement with a region of interest (ROI), the overlapping requirement requires an overlapping to the ROI to be less than a threshold.

At (S520), the ROI is determined based on the coded information of the current picture.

At (S530), the first block is determined to satisfy the overlapping requirement based on the ROI.

At (S540), at least a first block level syntax of the first block is obtained according a default value that is defined for blocks that satisfies the overlapping requirement.

At (S550), the first block is reconstructed based on the default value of the first block level syntax.

In some aspects, the region of interest is determined according to one or more signals (e.g., syntax elements) in the coded video bitstream that define at least one of a position, a shape and/or a size of the ROI.

In some aspects, the first block is a sub-partition of a larger block. The first block level syntax of the first block is determined not in the coded video bitstream when the first block satisfies the overlapping requirement.

In some aspects, an overlap of a second block to the ROI is determined to exceed the threshold. Then, from the coded video bitstream, at least a second block level syntax of the second block is parsed when the second block is determined to fail to satisfy the overlapping requirement.

In an example, the threshold is set to a default threshold value. In another example, from a high level syntax in the coded video bitstream, a signaled value of the threshold is extracted.

In some examples, a block partitioning mode of the first block is determined not in the coded video bitstream when the first block satisfies the overlapping requirement. In an example, a default value for the block partitioning mode of the first block is derived, the default value indicates no further partition.

In some examples, the residuals of the first block are set to a default residual value.

In some examples, reconstruction samples of the first block are set to a default sample value. In an example, the default sample value is set based on at least one of an output bit depth and an internal bit depth. In another example, the default sample value is extracted from the coded video bitstream.

In some examples, whether a group of samples of the first block is located within the ROI is checked, and whether the first block satisfies the overlapping requirement is determined based on the checking result.

In some examples, whether each sample of the first block is located within the ROI is checked. Whether the first block satisfies the overlapping requirement is determined based on the checking results.

In an example, for each N×N block of the first block, whether a specific sample of the N×N block is located within the ROI is checked, N being a positive integer. Whether the first block satisfies the overlapping requirement is determined based on the checking results.

In some aspects, the ROI is derived from the coded information of the current picture when the coded video bitstream lacks signals that define a position, a shape and/or a size of the ROI.

In some examples, reconstruction sample values of one or more samples in the current picture are reconstructed. The ROI is derived based on the reconstruction sample values of the one or more samples. In some examples, the reconstruction sample values are generated before applying a loop filter. In an example, a sample is determined not a part of the ROI when a reconstruction sample value of the sample is within a range that is defined based on a bit depth. For example, a sample is determined not a part of the ROI when a reconstruction sample value of the sample is a middle value of a full sample value range defined by a bit depth.

Then, the process proceeds to (S599) and terminates.

The process (500) can be suitably adapted. Step(s) in the process (500) can be modified and/or omitted. Additional step(s) can be added. Any suitable order of implementation can be used.

Figure 6:
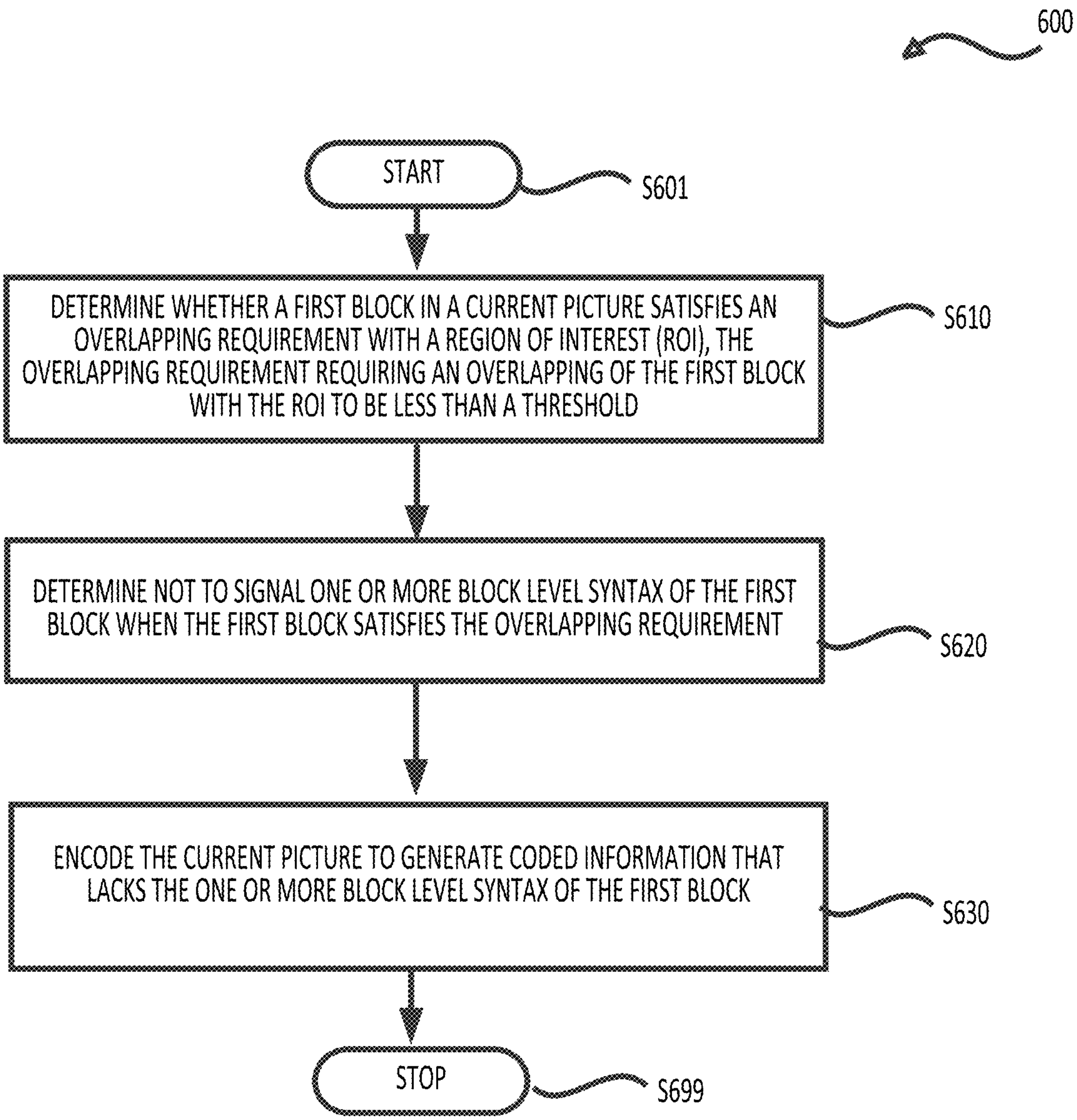
FIG. 6 shows a flow chart outlining an encoding process according to some aspects of the disclosure.

FIG. 6 shows a flow chart outlining a process (600) according to an aspect of the disclosure. The process (600) can be used in a video encoder. In various aspects, the process (600) is executed by processing circuitry, such as the processing circuitry that performs functions of the video encoder (103), the processing circuitry that performs functions of the video encoder (303), and the like. In some aspects, the process (600) is implemented in software instructions, thus when the processing circuitry executes the software instructions, the processing circuitry performs the process (600). The process starts at (S601) and proceeds to (S610).

At (S610), whether a first block in a current picture satisfies an overlapping requirement with a region of interest (ROI) is determined, the overlapping requirement requires an overlapping of the first block with the ROI to be less than a threshold.

At (S620), not to signal one or more block level syntax of the first block is determined when the first block satisfies the overlapping requirement.

At (S630), the current picture is encoded to generate coded information that lacks the one or more block level syntax of the first block.

In some aspects, one or more signals (e.g., one or more syntax elements) are included in the coded information, the one or more signals define at least one of a position, a shape and/or a size of the ROI.

In some examples, the first block is a sub-partition of a larger block, not to include the first block level syntax of the first block in the coded information is determined when the first block satisfies the overlapping requirement.

In some examples, an overlap of a second block to the ROI is determined to exceed the threshold. At least a second block level syntax of the second block is determined to be included in the coded information when the second block fails to satisfy the overlapping requirement.

In some examples, a high level syntax is included in the coded information, the high level syntax indicates a signaled value of the threshold.

In some examples, not to include a block partitioning mode of the first block in the coded information is determined when the first block satisfies the overlapping requirement.

In some examples, not to encode residuals of samples in the first block into the coded information is determined when the first block satisfies the overlapping requirement.

In some examples, the picture is encoded with reconstruction samples of the first block being set to a default sample value. In an example, the default sample value is set based on at least one of an output bit depth and an internal bit depth. In another example, the default sample value is signaled in into the coded information.

In some examples, whether a group of samples of the first block is located within the ROI is checked. Whether the first block satisfies the overlapping requirement based on the checking results.

In some examples, whether each sample of the first block is located within the ROI is checked. Whether the first block satisfies the overlapping requirement is determined based on the checking results.

In an example, for each N×N block of the first block, whether a specific sample of the N×N block is located within the ROI is checked, N being a positive integer. Whether the first block satisfies the overlapping requirement is determined based on the checking results.

In some aspects, the coded information of the current picture lacks signals that define a position, a shape and/or a size of the ROI. The ROI can be derived by the decoder based on the coded information. In some examples, the picture is encoded with reconstruction sample values of samples out of the ROI being limited to a specific range. Thus, at the decoder side, when values of the reconstructed samples are in the specific range, the decoder can determine that the reconstructed samples are out of the ROI. In an example, the reconstruction sample values are generated before applying a loop filter.

In some examples, the specific range is defined based on a bit depth. In an example, the picture is encoded with reconstruction sample values of samples out of the ROI being limited to a middle value of a full sample value range defined by a bit depth.

Then, the process proceeds to (S699) and terminates.

The process (600) can be suitably adapted. Step(s) in the process (600) can be modified and/or omitted. Additional step(s) can be added. Any suitable order of implementation can be used.

According to an aspect of the disclosure, a method of processing visual media data is provided. In the method, a conversion between a visual media file and a bitstream of visual media data is performed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of a picture, the picture includes at least a first block that satisfies an overlapping requirement with a region of interest (ROI), the overlapping requirement requires an overlapping to the ROI to be less than a threshold. The format rule specifies that: the ROI is determined based on the coded information of the picture; the first block is determined to satisfy the overlapping requirement based on the ROI; at least a first block level syntax of the first block is obtained according a default value that is defined for blocks that satisfies the overlapping requirement; and the first block is reconstructed based on the default value of the first block level syntax.

The techniques described above, can be implemented as computer software using computer-readable instructions and physically stored in one or more computer-readable media. For example, FIG. 7 shows a computer system (700) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
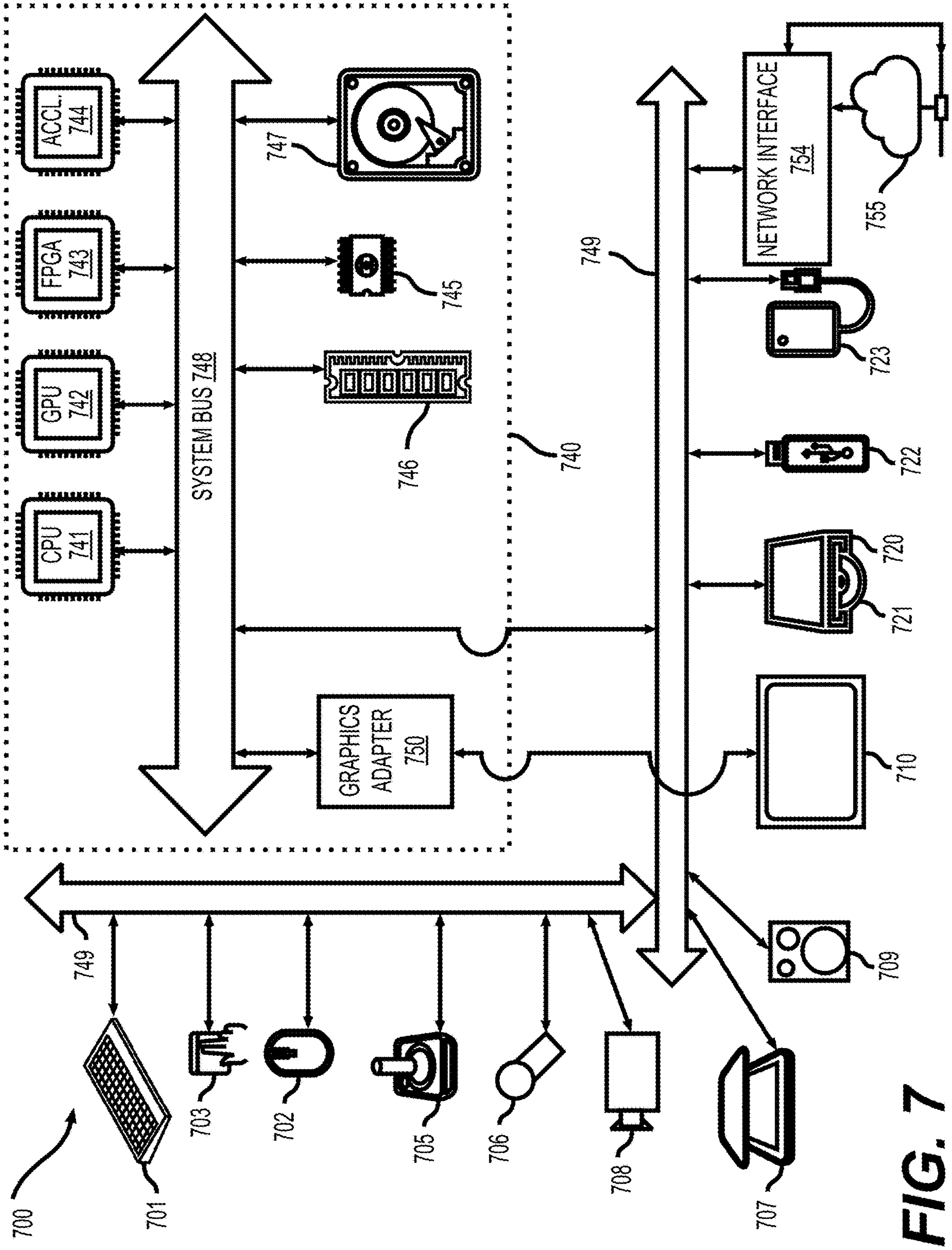
FIG. 7 is a schematic illustration of a computer system in accordance with an aspect.

The components shown in FIG. 7 for computer system (700) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various aspects of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1). A method of video decoding, including: receiving a coded video bitstream including at least coded information of a current picture, the current picture including at least a first block that satisfies an overlapping requirement with a region of interest (ROI), the overlapping requirement requiring an overlapping to the ROI to be less than a threshold; determining the ROI based on the coded information of the current picture; determining that the first block satisfies the overlapping requirement based on the ROI; obtaining at least a first block level syntax of the first block according a default value that is defined for blocks that satisfies the overlapping requirement; and reconstructing the first block based on the default value of the first block level syntax.

(2). The method of feature (1), in which the determining includes: determining the region of interest according to one or more signals in the coded video bitstream that define at least one of a position, a shape and/or a size of the ROI.

(3). The method of any of features (1) to (2), in which the first block is a sub-partition of a larger block, and the method includes: determining that the first block level syntax of the first block is not in the coded video bitstream when the first block satisfies the overlapping requirement.

(4). The method of any of features (1) to (3), further including: determining that an overlap of a second block to the ROI exceeds the threshold; and parsing, from the coded video bitstream, at least a second block level syntax of the second block when the second block fails to satisfy the overlapping requirement.

(5). The method of any of features (1) to (4), further including at least one of: setting the threshold to a default threshold value; and/or extracting, from a high level syntax in the coded video bitstream, a signaled value of the threshold.

(6). The method of any of features (1) to (5), further including: determining that a block partitioning mode of the first block is not in the coded video bitstream when the first block satisfies the overlapping requirement; and deriving a default value for the block partitioning mode of the first block, the default value indicting no further partition.

(7). The method of any of features (1) to (6), in which the reconstructing includes: setting residuals of the first block to a default residual value.

(8). The method of any of features (1) to (7), in which the reconstructing includes: setting reconstruction samples of the first block to a default sample value.

(9). The method of any of features (1) to (8), in which the default sample value is set based on at least one of an output bit depth and an internal bit depth.

(10). The method of any of features (1) to (9), further including: extracting the default sample value from the coded video bitstream.

(11). The method of any of features (1) to (10), further including: checking whether a group of samples of the first block is located within the ROI; and determining whether the first block satisfies the overlapping requirement based on the checking.

(12). The method of any of features (1) to (11), further including: checking whether each sample of the first block is located within the ROI; and determining whether the first block satisfies the overlapping requirement based on the checking.

(13). The method of any of features (1) to (12), further including: checking, for each N×N block of the first block, whether a specific sample of the N×N block is located within the ROI, N being a positive integer; and determining whether the first block satisfies the overlapping requirement based on the checking.

(14). The method of any of features (1) to (13), in which the determining includes: deriving the ROI from the coded information of the current picture when the coded video bitstream lacks signals that define a position, a shape and/or a size of the ROI.

(15). The method of any of features (1) to (14), further including: generating reconstruction sample values of one or more samples in the current picture; and deriving the ROI based on the reconstruction sample values of the one or more samples.

(16). The method of any of features (1) to (15), in which the reconstruction sample values are generated before applying a loop filter.

(17). The method of any of features (1) to (16), in which the deriving includes: determining that a sample is not a part of the ROI when a reconstruction sample value of the sample is within a range that is defined based on a bit depth.

(18). The method of any of features (1) to (17), in which the deriving includes: determining that a sample is not a part of the ROI when a reconstruction sample value of the sample is a middle value of a full sample value range defined by a bit depth.

(19). A method of video encoding, including: determining whether a first block in a current picture satisfies an overlapping requirement with a region of interest (ROI), the overlapping requirement requiring an overlapping of the first block with the ROI to be less than a threshold; determining not to signal one or more block level syntax of the first block when the first block satisfies the overlapping requirement; and encoding the current picture to generate coded information that lacks the one or more block level syntax of the first block.

(20). The method of feature (19), further including: including one or more signals in the coded information that define at least one of a position, a shape and/or a size of the ROI.

(21). The method of any of features (19) to (20), in which the first block is a sub-partition of a larger block, and the method includes: determining not to include the first block level syntax of the first block in the coded information when the first block satisfies the overlapping requirement.

(22). The method of any of features (19) to (21), further including: determining that an overlap of a second block to the ROI exceeds the threshold; and including at least a second block level syntax of the second block in the coded information when the second block fails to satisfy the overlapping requirement.

(23). The method of any of features (19) to (22), further including: including a high level syntax in the coded information that indicates a signaled value of the threshold.

(24). The method of any of features (19) to (23), further including: determining not to include a block partitioning mode of the first block in the coded information when the first block satisfies the overlapping requirement.

(25). The method of any of features (19) to (24), further including: determining not to encode residuals of samples in the first block into the coded information when the first block satisfies the overlapping requirement.

(26). The method of any of features (19) to (25), in which the encoding includes: encoding the picture with reconstruction samples of the first block being set to a default sample value.

(27). The method of any of features (19) to (26), in which the default sample value is set based on at least one of an output bit depth and an internal bit depth.

(28). The method of any of features (19) to (27), further including: including the default sample value into the coded information.

(29). The method of any of features (19) to (28), further including: checking whether a group of samples of the first block is located within the ROI; and determining whether the first block satisfies the overlapping requirement based on the checking.

(30). The method of any of features (19) to (29), further including: checking whether each sample of the first block is located within the ROI; and determining whether the first block satisfies the overlapping requirement based on the checking.

(31). The method of any of features (19) to (30), further including: checking, for each N×N block of the first block, whether a specific sample of the N×N block is located within the ROI, N being a positive integer; and determining whether the first block satisfies the overlapping requirement based on the checking.

(32). The method of any of features (19) to (31), in which the coded information of the current picture lacks signals that define a position, a shape and/or a size of the ROI.

(33). The method of any of features (19) to (32), further including: encoding the picture with reconstruction sample values of samples out of the ROI being limited to a specific range.

(34). The method of any of features (19) to (33), in which the reconstruction sample values are generated before applying a loop filter.

(35). The method of any of features (19) to (34), in which the specific range is defined based on a bit depth.

(36). The method of any of features (19) to (35), further including: encoding the picture with reconstruction sample values of samples out of the ROI being limited to a middle value of a full sample value range defined by a bit depth.

(37). A method of video processing, the method including: processing a bitstream of video data according to a format rule, in which: the bitstream includes coded information of a picture, the picture including at least a first block that satisfies an overlapping requirement with a region of interest (ROI), the overlapping requirement requiring an overlapping to the ROI to be less than a threshold; and the format rule specifies that: the ROI is determined based on the coded information of the picture; the first block is determined to satisfy the overlapping requirement based on the ROI; at least a first block level syntax of the first block is obtained according a default value that is defined for blocks that satisfies the overlapping requirement; and the first block is reconstructed based on the default value of the first block level syntax.

(38). An apparatus for video decoding, including processing circuitry that is configured to perform the method of any of features (1) to (18).

(39). An apparatus for video encoding, including processing circuitry that is configured to perform the method of any of features (19) to (36).

(40). A non-transitory computer-readable storage medium storing instructions which when executed by at least one processor cause the at least one processor to perform the method of any of features (1) to (37).

What is claimed is:

1. A method of video decoding, comprising:
- receiving a coded video bitstream including at least coded information of a current picture, the current picture including at least a first block;
- determining a region of interest (ROI) based on the coded information of the current picture;
- determining whether the first block satisfies an overlapping requirement based on the ROI, the overlapping requirement requiring an overlap with the ROI to be less than a threshold;
- when the first block is determined to satisfy the overlapping requirement,
  - determining that a first block level syntax of the first block is not signaled in the coded video bitstream, and
  - obtaining a value of the first block level syntax of the first block based on a default value that is defined for blocks that satisfy the overlapping requirement; and
- reconstructing the first block based on the value of the first block level syntax.

2. The method of claim 1, wherein the determining the ROI comprises:
- determining the ROI according to one or more signals in the coded video bitstream that define at least one of a position, a shape, and/or a size of the ROI.

3. The method of claim 1, wherein the first block is a sub-partition of a coding block.

4. The method of claim 1, further comprising:
- determining whether a second block satisfies the overlapping requirement based on the ROI; and
- parsing, from the coded video bitstream, at least a second block level syntax of the second block when the second block is determined not to satisfy the overlapping requirement.

5. The method of claim 1, further comprising at least one of:
- setting the threshold to a default threshold value; or
- extracting, from a high level syntax in the coded video bitstream, a signaled value of the threshold.

6. The method of claim 3, further comprising:
- determining that a block partitioning mode of the first block is not in the coded video bitstream when the first block satisfies the overlapping requirement; and
- deriving a default setting for the block partitioning mode of the first block, the default setting indicating no further partition.

7. The method of claim 1, wherein the reconstructing comprises:
- when the first block is determined to satisfy the overlapping requirement, setting residuals of the first block to a default residual value.

8. The method of claim 1, wherein the reconstructing comprises:
- when the first block is determined to satisfy the overlapping requirement, setting reconstruction samples of the first block to a default sample value.

9. The method of claim 8, wherein the default sample value is set based on at least one of an output bit depth and an internal bit depth.

10. The method of claim 8, further comprising:
- extracting the default sample value from the coded video bitstream.

11. The method of claim 1, further comprising:
- checking whether a group of samples of the first block is located within the ROI; and
- determining whether the first block satisfies the overlapping requirement based on the checking.

12. The method of claim 1, further comprising:
- checking whether each sample of the first block is located within the ROI; and
- determining whether the first block satisfies the overlapping requirement based on the checking.

13. The method of claim 1, further comprising:
- checking, for each N×N block of the first block, whether a specific sample of the N×N block is located within the ROI, N being a positive integer; and
- determining whether the first block satisfies the overlapping requirement based on the checking.

14. The method of claim 1, wherein the determining the ROI comprises:
- deriving the ROI from the coded information of the current picture when the coded video bitstream lacks signals that define a position, a shape, and/or a size of the ROI.

15. The method of claim 14, further comprising:
- generating reconstruction sample values of one or more samples in the current picture; and
- deriving the ROI based on the reconstruction sample values of the one or more samples.

16. The method of claim 15, wherein the reconstruction sample values are generated before applying a loop filter.

17. The method of claim 15, wherein the deriving the ROI based on the reconstruction sample values comprises:
- determining that a sample is not a part of the ROI when a reconstruction sample value of the sample is within a range that is defined based on a bit depth.

18. The method of claim 15, wherein the deriving the ROI based on the reconstruction sample values comprises:

determining that a sample is not a part of the ROI when a reconstruction sample value of the sample is a middle value of a full sample value range defined by a bit depth.

19. A method of video encoding, comprising:

determining whether a first block in a current picture satisfies an overlapping requirement with a region of interest (ROI), the overlapping requirement requiring an overlapping of the first block with the ROI to be less than a threshold;

determining not to signal one or more block level syntax of the first block when the first block satisfies the overlapping requirement; and encoding the current picture to generate coded information that lacks the one or more block level syntax of the first block.

20. A non-transitory computer-readable storage medium storing instructions which when executed by a processor cause the processor to perform a method of encoding a bitstream, the method comprising:

determining whether a first block in a current picture satisfies an overlapping requirement with a region of interest (ROI), the overlapping requirement requiring an overlapping of the first block with the ROI to be less than a threshold;

determining not to signal one or more block level syntax of the first block in the bitstream when the first block satisfies the overlapping requirement;

encoding the current picture to generate coded information included in the bitstream that lacks the one or more block level syntax of the first block; and transmitting the bitstream.

* * * * *